Jan. 15, 1929.
R. A. WHITTINGHAM
OIL SEAL FOR GEAR HOUSINGS
Original Filed March 2, 1923
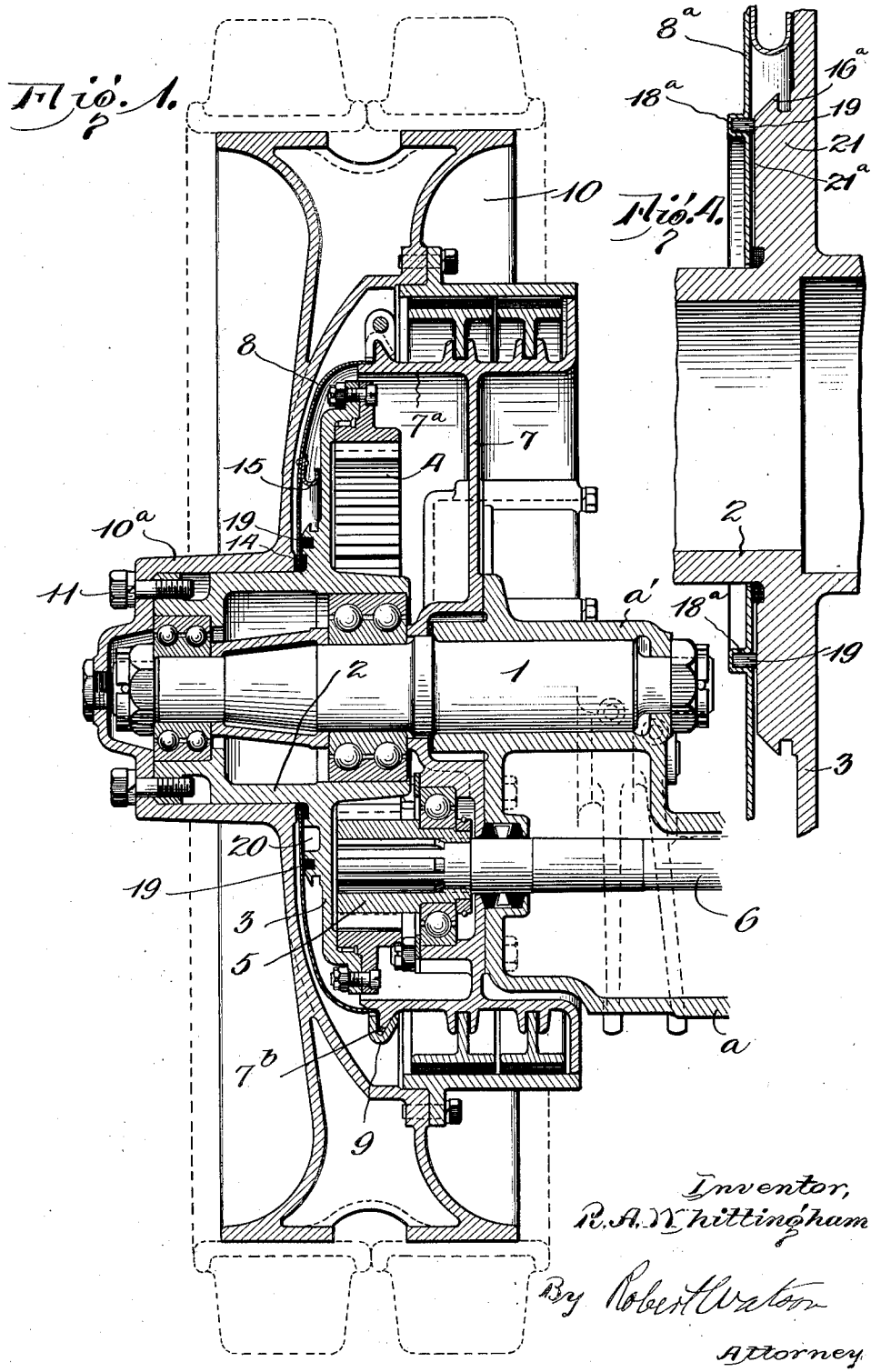

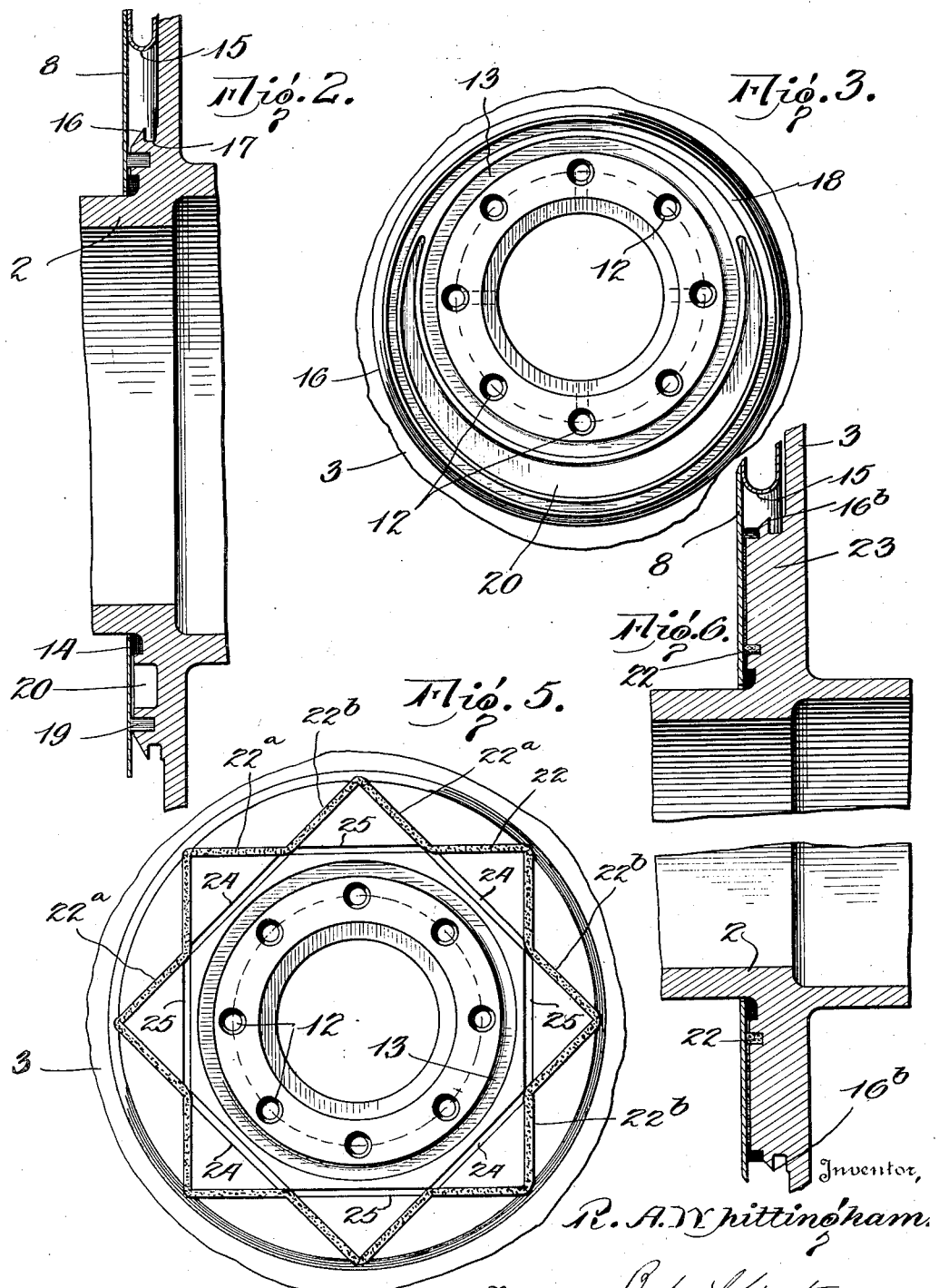

Patented Jan. 15, 1929.

1,699,385

UNITED STATES PATENT OFFICE.

RICHARD A. WHITTINGHAM, OF NEWARK, DELAWARE.

OIL SEAL FOR GEAR HOUSINGS.

Application filed March 2, 1923, Serial No. 622,340. Renewed February 15, 1924.

This invention relates to an oil seal for preventing the escape of oil from casings or housings which enclose gears, or other running parts, portions of which project through the housing. The invention is more particularly intended for use in connection with housings or casings arranged upon the rear axles of motor driven trucks for enclosing the gears which are associated with the truck wheels. The housing which encloses the gearing is necessarily provided with an opening in its front side through which the hub or hollow spindle, on which the wheel is mounted, projects and it is necessary to provide an oil seal around this opening to prevent oil from passing out and getting upon the brake bands and brake drum. Usually a packing ring, concentric with the hub, is employed between the hub and the casing but this has been found to be ineffective as a means for retaining the oil, although effective as a dust-excluding means.

In order to form a more effective oil seal for truck gear housings, I provide, between the housing and a part which rotates with the hub, a packing which is so formed that it continuously wipes the oil away from the opening in the housing as the wheel rotates in either direction, and thus, little if any oil can pass to the opening in the housing or the packing which is usually arranged at the margin of such opening. This wiping joint is preferably formed by providing upon a part which rotates with the hub a packing ring which is eccentric to the axis of the hub and which bears upon a part of the housing surrounding the opening therein, although the eccentric ring may be secured to the housing and bear upon a plane surface which rotates with the hub; or the packing ring may be concentric with the hub and have a more or less sinous or angular outline which will provide surfaces on the packing for brushing the oil outwardly from the opening in both directions of movement of the hub and truck wheel.

In the accompanying drawing,

Fig. 1 is a central vertical section through one end of a truck axle, a traction wheel having an internal gear drive and the housing enclosing the gearing, showing the preferred form of wiping joint between the gear and housing;

Fig. 2 is a central section through parts of the gear hub and housing showing the eccentric wiping joint of Fig. 1 on a larger scale;

Fig. 3 is a face view of the hub and the oil slinger thereon, looking from left to right in Fig. 1;

Fig. 4 is a vertical section through a hub and part of a housing, showing the eccentric packing ring mounted on the housing;

Fig. 5 is a face view of a hub showing a modified arrangement of the packing; and Fig. 6 is a central vertical section through the hub shown in Fig. 5 and a part of the housing.

Referring to Figs. 1, 2, and 3 of the drawing, $a$ represents the load supporting member of the rear axle of a motor vehicle having an upward extension $a'$, in which is secured a wheel spindle 1. Upon this spindle is mounted a gear hub 2, having a web 3 which carries an internal gear 4. This gare is driven by a pinion 5 upon an axle 6, which extends through the dead axle or load supporting member and is operated from the differential gearing in the usual manner. Upon the end of the load supporting member is secured a gear housing or oil casing consisting of a web 7, which constitutes the back plate of the housing, having an annular flange 7$^a$ which projects over the gear 4, and a sheet metal disklike front plate 8 which is secured to the flange 7$^a$ and extends in front of the web of the gear. This plate has a central opening through which the gear hub extends, this opening being only slightly larger than the hub so that the plate extends close to the periphery of the hub. The plate 8 is secured to a taper rib 7$^b$ on the flange 7$^a$ by a clamping ring 9 which is V-shaped in cross section and the joint formed by these parts is oil-tight. The housing or casing thus formed is adapted to contain oil of sufficient depth to permit the gear to dip into it, and the gear carries the oil around and distributes it to the several bearings shown. The traction wheel 10 has a hub 10ª which is mounted upon the part of the gear hub which projects through the oil casing. The wheel hub is integral with the wheel and is secured to the gear hub by bolts 11, which extend into threaded openings 12 in the gear hub, these latter openings being shown in Fig. 3.

In the web of the gear, adjacent the hub and concentric with it, is an annular recess 13, Fig. 3, in which is fitted a packing ring 14, shown in the other figures of the drawing, which ring bears against the inner face of the plate 8, adjacent the margin of its central opening, and this packing ring forms with the plate a running joint, the principal function of which is to prevent dust and dirt from passing into the housing. Above this joint, is shown in section, a gutter 15 which is secured to the stationary plate 8, and this gutter extends around the upper part of the hub, as shown in Fig. 3, and catches the oil which flows toward the hub on the upper part of the front plate 8 and directs it back into the bottom of the oil casing. The web of the gear, adjacent the hub, is thickened to provide an annular fin 16 which serves as an oil slinger, and this fin is spaced from the face of the web by an annular groove or channel 17, formed in the thickened portion of the web. The fin which constitutes the oil slinger is eccentric to the axis of the hub, as shown in Figs. 1, 2, and 3, and within the recess 18, adjacent the fin and concentric with it but eccentric to the axis of the hub, is arranged a packing ring 19, preferably of leather, which bears against the adjacent face of the front plate 8 of the housing. Between the concentric channel 13 and the eccentric channel 18 a crescent-shaped recess 20 is shown in the drawing, but this merely represents a part of the web cut out for the sake of reducing weight.

In the operation of the invention, as illustrated in Figs. 1 to 3 of the drawing, as the wheel and gear rotate, the oil from the bottom of the casing is carried around by the gear and distributed by gravity to the various bearings and the gear teeth also are lubricated. Any oil flowing down on the inner surface of the front or outer wall 8 of the housing is caught by the gutter 15 and prevented from passing to the joint between the gear and the housing. Oil flowing down on the outer face of the gear passes into the channel 17 and the greater part of this oil is thrown off by the oil slinger against the underside of the gutter 15 or directly into the lower part of the casing. These features for catching and throwing off the oil are not a part of the present invention, although used in conjunction with it. Some of the oil will pass the oil slinger and also drain from the underside of the gutter on to the inner face of the front wall of the housing, and some of this oil would eventually pass through the running joint formed by the concentric packing ring 14 if it were not for the wiping joint formed by the eccentric packing ring 19. As the gear revolves, this eccentric packing ring continuously wipes the oil outwardly from the running joint and as the outer edge of the ring is close to the sloping surface of the oil slinger, any oil swept outwardly by the ring above the axis of the spindle will pass on to the oil slinger and be thrown off, or will be carried around on the front plate 8 by the ring to a point where it will flow by gravity into the lower part of the casing and thus will be prevented from passing to the opening in the housing through which the hub extends. The width of the annular surface on the front plate which is swept or wiped by the eccentric packing ring will be equal to twice the distance between the centers of the ring and spindle. It will be noted that the eccentric packing ring will wipe the oil radially outward on the front plate in either direction of rotation of the gear and wheel. This wiping joint is found to be extremely effective in preventing oil from reaching the joint between the housing and the hub.

In the foregoing figures, the eccentric packing ring is mounted upon a part which rotates with the hub, and that is the preferred arrangement; but the eccentric packing ring may be mounted upon the front plate of the housing and bear against a flat surface rotating with the hub, as shown in Fig. 4. In this latter figure, the front plate 8ª of the oil casing is formed with a groove 18ª which is eccentric to the axis of the hub, and in this groove is arranged a packing ring 19 which bears against a plane surface 21ª upon a thickened portion 21 of the web of the gear. This thickened portion is formed with an oil slinger 16ª which is concentric with the axis of the hub.

In the operation of the structure shown in Fig. 4, as the gear and wheel revolve, the surface 21ª will be wiped by the eccentric packing ring and any oil tending to flow toward the hub between the face 21ª and the front plate will be wiped outwardly toward the oil slinger and will be thrown off. In Fig. 4, the center of the wiping ring is above the axis of the hub and the ring approaches close to the oil slinger at the upper edge of the latter. This is the most desirable arrangement because the ring is in position to prevent the downward flowing oil from passing between the surface 21ª and the plate 8 at the point where the oil has the greatest tendency to flow directly to the joint between the casing and the hub. The eccentric ring may, however, be located so that its axis will be below or at either side of the axis of the hub, and in any eccentric position it will operate to cause the oil to be swept or wiped outwardly on the face of the surface 21ª as the hub revolves.

With this arrangement, the wiping ring is close to the oil slinger at one point in the circumference of the latter and remote from the oil slinger at its diametrically opposite point, while in Figs. 1 to 3, inclusive, the wiping ring is close to the oil slinger at all points, and for this reason the arrangement shown in the latter figures is preferred.

In Figs. 5 and 6, I have shown a modification in which the wiping ring 22, instead of being eccentric to the axis of the hub is arranged in the form of a continuous band having a series of alternate inward and outward bends, the latter being at the periphery of the oil slinger which is concentric with the axis of the hub. This band, instead of extending along short straight lines and having angular bends might be arranged in a more or less sinuous form, but it is more convenient and economical to form the slots in which the band is held on straight lines, and hence the band, in the drawing, takes the form shown. This band may be arranged on the housing, but it is shown upon the thickened portion 23 of the web of the gear and bears against the outer plate 8 of the oil casing. This thickened portion has a fin 16ᵇ, concentric with the axis of the hub and constituting an oil slinger. In the face of this thickened portion are milled a plurality of straight slots 24, forming a square, the angles of which are at the periphery of the oil slinger and these slots are intersected by a plurality of similar slots 25, forming a square, the angles of which are at the periphery of the oil slinger. The band as shown is arranged within those parts of the channels which constitute the corner portions of the squares and the band extends to the periphery of the oil slinger at these corners.

In the operation of the wiper shown in Figs. 5 and 6, as the gear rotates in the clockwise direction, in Fig. 5, any oil flowing on the plate 8 toward the hub will be caught by the stretches 22ª of the band and as these stretches are inclined outwardly and also backwardly with respect to the direction of rotation of the gear, the oil will flow outwardly along these stretches to the oil slinger and will be thrown off. When the wheel rotates in the opposite direction, the oil on the plate 8 will be caught by the stretches 22ᵇ of the band, which slope rearwardly with respect to the direction of rotation and also outwardly to the oil slinger, and the oil will be carried out to the oil slinger and thrown off.

What I claim is:

1. The combination with an oil casing having an opening in one side, of a rotatably mounted member projecting through said opening, said casing and member having opposed parts arranged side by side adjacent the opening, and a packing ring on one of said parts bearing against the other part, said ring having its outer margin non-concentric with the axis of said member and adapted to wipe oil away from the margin of the ring and from the margin of said opening in both directions of movement of said member.

2. The combination with an oil casing having an opening in one side, of a rotatably mounted member projecting through said opening, said casing and member having opposed parts adjacent the opening, and said member having an annular fin constituting an oil slinger, and a packing ring on one of said parts bearing against the other part within the margin of said fin, said ring having its outer margin non-concentric with the axis of said member and adapted to wipe oil away from the margin of said opening and toward the margin of said fin while said member is rotating.

3. The combination with an oil casing having an opening in one side, of a rotatably mounted member projecting through said opening, said casing and member having opposed parts arranged side by side adjacent the opening, and a packing ring on said member bearing against the opposed part of the casing, said ring having it outer margin non-concentric with the axis of said member and arranged to wipe oil away from the margin of said opening in both directions of rotation.

4. The combination with an oil casing having an opening in one side, of a rotatably mounted member projecting through said opening, said casing and member having opposed parts adjacent the opening and said member having an annular fin constituting an oil slinger, and a packing ring on said member within the margin of said fin and bearing against the opposed part of the casing, said ring having its outer margin non-concentric with the axis of said member and adapted to wipe oil away from the margin of said opening and toward the margin of said fin while said member is rotating.

5. The combination with an oil casing having an opening in one side, of a rotatably mounted member projecting through said opening, said casing and member having opposed parts adjacent the opening and said member having an annular fin eccentric to its axis and constituting an oil slinger, and a packing ring on said member, eccentric to its axis and adjacent the margin of the fin, said ring bearing against the opposed part of the casing.

6. The combination with a gear mounted for rotation about a horizontal axis and having a hub, and a casing enclosing the gear and having an opening in one side through which said hub projects, said gear and casing having opposing parts arranged side by side in vertical planes, and a packing ring on one of said parts having its outer margin non-eccentric with the axis of said hub and adapted to wipe oil away from said margin of the ring and from the margin of said opening in both directions of rotation of the gear.

In testimony whereof I hereunto affix my signature.

RICHARD A. WHITTINGHAM.